United States Patent

[11] 3,591,779

| [72] | Inventor | Arthur A. Sutherland, Jr.<br>Woburn, Mass. |
|---|---|---|
| [21] | Appl. No. | 707,268 |
| [22] | Filed | Feb. 21, 1968 |
| [45] | Patented | July 6, 1971 |
| [73] | Assignee | Massachusetts Institute of Technology<br>Cambridge, Mass. |

[54] VARIABLE FREQUENCY COMPENSATION FOR SAMPLED DATA CONTROL SYSTEMS
10 Claims, 13 Drawing Figs.

[52] U.S. Cl. ........................................... 235/151.1,
235/150.4, 235/151.34, 318/636
[51] Int. Cl. .......................................... G06f 15/46
[50] Field of Search ............................... 235/151,
151.1, 151.11, 150.1; 340/172.5; 318/18, 636;
328/151

[56] References Cited
UNITED STATES PATENTS
3,109,970  11/1963  Smyth .......................... 235/150.1
3,211,974  10/1965  Rhodes ..................... 318/18
3,428,791  2/1969  Chandos ..................... 235/151.1
3,436,636  4/1969  James ..................... 318/18

Primary Examiner—Malcolm A. Morrison
Assistant Examiner—Felix D. Gruber
Attorneys—Thomas Cooch, Joseph J. Alekshun, Jr. and Arthur A. Smith, Jr.

ABSTRACT: Compensation for a sampled data control system that in effect provides a functional coupling between the compensation frequency and the plant's responsiveness to its control signal. The plant's behavioral properties are determined by the characteristic frequency of a dominant pole. The characteristic frequency is monitored and controls the rate at which compensation is applied. As the plant's response becomes faster the compensation rate is increased and, conversely, as it becomes slower the compensation rate is appropriately reduced.

INVENTOR:
ARTHUR A. SUTHERLAND, JR.
BY Joseph J. Alekshun Jr.
ATTORNEY

FIG. 3

X'S = POLES
O'S = ZEROES

FIG. 3A

S-PLANE MAP

FIG. 3B

INVENTOR:
ARTHUR A. SUTHERLAND, JR.
BY Joseph J. Alekshun Jr.
ATTORNEY

VARIABLE FREQUENCY COMPENSATION FOR SAMPLED DATA CONTROL SYSTEMS

The invention herein described was made in the course of or under a contract with the Department of Defense.

BACKGROUND OF THE INVENTION

This invention relates generally to sampled data control systems, and particularly to improvements in compensation for such systems.

A sampled-data system may be defined as one having one or more control loops operating on a discontinuous rather than continuous control signal. Like continuous systems, they are compensated to improve stability and performance. The appropriate compensation is derived by synthesizing a transfer function that combines with the dynamic characteristics of the plant to produce a satisfactory closed loop transfer function. Generally, compensation is designed by one or more analytical or graphic methods of pole-zero synthesis in the so-called sor zplane as described by Truxal, in *Control System synthesis*, McGraw-Hill, 1955, or Tou in *Digital and Sampled-Data Control Systems*, McGraw-Hill, 1959.

Designing appropriate compensation for real plants is complicated because their physical and dynamic characteristics vary with time. This behavior arises from parametric variations of the plant or its operating environment. For instance, the dynamic response of an aircraft greatly depends on the air density in its region of operation. The aircraft will react more quickly at a low altitudes than at high altitudes to identical control movements of the pilot. Similarly, the dynamic behavior of a process control may be sensitive to temperature of a fluid being processed. Because of such variations, compensation optimizing performance for one condition may not be satisfactory for another.

Where changes in plant dynamics are anticipated, the practice is to design a plurality of compensations each corresponding to a range of plant conditions. The system then switches between the multiple compensations as changes occur. In the case of the above control, compensations would be provided for each of the principal flight regimes the aircraft is expected to fly. Multiple compensations would similarly be applied to the process control, each covering a separate temperature range.

While multiple compensations may be supplied by a set of parallel networks, the use of a digital computer is more common. The computer modifies a control signal coupled to the plant in accordance with a difference equation. The coefficients of the equation are related to the poles and zeros of the compensation and thus determine the nature of the compensation provided. A program defines the set of coefficients necessary for compensating the system in each segment of the range of the plants expected behavior. The matter of digital compensation is generally discussed in *Digital Processes for Sampled Data Systems*, by A. J. Monroe, Wiley, 1962, chapter 25.

However, the notion of providing multiple compensations, each corresponding to a segment of the systems overall behavioral range, is not efficient or satisfactory. The designer must compromise between an extensive number of alternatives to provide a close fit with the plants particular needs or a smaller number that is less tailored to meet them. Special attention must also be directed to boundary conditions to insure that the transition from one discrete compensation to the next is sufficiently smooth so as not to disrupt the system. This process obviously requires a considerable amount of analysis and simulation.

In view of the foregoing limitations of multiple compensations for sampled data systems, the primary object of this invention is to provide improved compensation for such systems.

It is another object of this invention to provide compensation that varies incrementally with time according to dynamic variations occurring in the plant.

It is a further object of this invention to provide compensation that is simpler to implement.

These and other objects are met by compensation wherein the compensation frequency is varied according to variations in the plants dynamic character. The compensation in effect performs a frequency scaling operation by functionally coupling the compensation frequency to the plants responsiveness to its control signal. The plant's ability to respond is reflected by the characteristic frequency of its dominant poles. The system becomes faster as the characteristic frequency increases and slower as it decreases. The compensation includes a transducer for monitoring the characteristic frequency of a selected dominant pole, a compensator for compensating the control signal, and a calculator for synchronizing the rate at which compensation is applied. Operationally, variations in the characteristic frequency of the selected pole arising out of parametric changes in the plant or its operating environment are monitored by the transducer. These are transformed into signals coupled to the calculator. The calculator performs an internal division of a basic clock rate, the divisor being inversely proportional to the characteristic frequency of the pole. Based on this division, the calculator supplies timing signals to the compensator at a frequency proportional to the characteristic frequency. As the plants responsiveness becomes faster, the control systems need for more rapid compensation is satisfied by an increase in compensation rate. Conversely, as the plants response becomes slower, the compensation rate is appropriately reduced. Since the pole monitoring and compensation are frequent, variations in the compensation rate are incremental and do not introduce an appreciable step in the control signal to disrupt the system.

THEORETICAL PRINCIPLE

Figure 1:
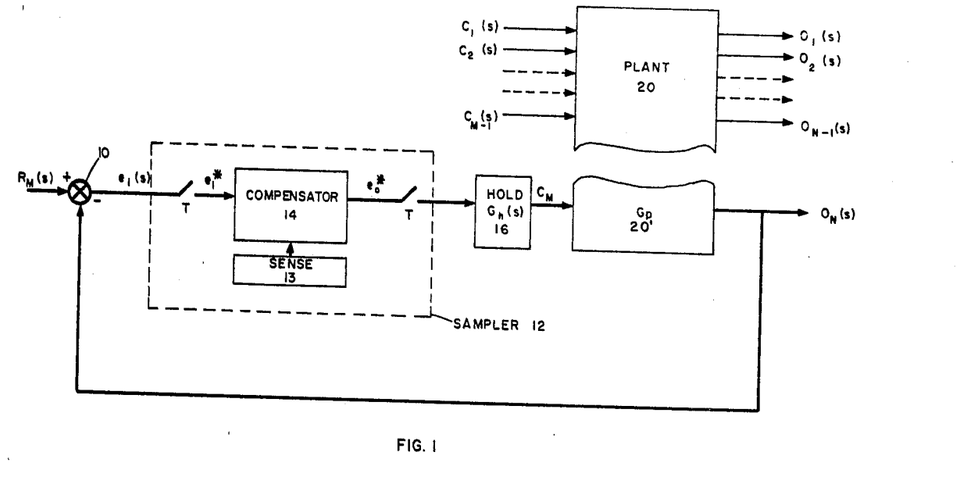
FIG. 1 is a block diagram of a typical sampled data system of the prior art.

A typical sampled-data control system is illustrated in FIG. 1. Plant 20 has N output variables, $0_1(s)$, $0_2(s)$ ... $O_{N11}(s)$, $0_N(s)$, in correspondence with control signals $C_1(s)$, $C_2(s)$ ...$C_M(s)$. The control signals are supplied by feedback control loops, one or more being of the sampled-data class illustrated in FIG. 1 comprising comparator 10, sampler 12 and holding unit 16. Sampler 12 usually includes a compensator 14 in the form of a digital computer that operates on a difference equation. Compensator 14 improves the stability of the loop and provides a preferred response in the corresponding output variable $0_N(s)$.

In illustrations such as FIG. 1 depicting sampled data control systems, sampling is symbolically designated by "free-running " mechanical switches that are understood to close momentarily and open again. During the closing the signal is coupled to the subsequent unit. The closings occur at a frequency that is the reciprocal of the sampling period T associated with the switch. In actual systems the sampling is not ordinarily performed by mechanical switches but rather by elementary electronic circuits composed of diodes and transistors that repeatedly provide an instantaneous low impedance path between an input and output terminal.

In the system of FIG. 1, after each sampling the computer provides a new compensated output signal $e_0^*$ from computations conforming with the difference equation. The activation of sense line 13 causes the computer to perform a new calculation. The sense line is activated by a clock generator (not shown) internal to the computer that supplies a series of timing signals of fixed frequency. The timing signals are also coupled to the electronic switching circuits and support the "free-running" capability of the switches.

Accordingly, the amplitude of error signal $e_i$, which is the difference between command $R_M(s)$ and output $O_N(s)$, is periodically sampled at frequency $f=1/T$. Compensator 14 receives sampled error signal $e_i^*$ and processes it through a difference equation to provide output signal $e_0^*$. The amplitude of the latter signal is sampled and stored by holding unit 16 and constitutes discontinuous control signal $C_M(s)$. The sampling period of hold unit 16 is usually $T$, the same as that of the compensator. However, in so-called multirate systems the sampling period may be less in which case the hold unit has a sampling period that is a fixed fraction of period $T$.

The open-loop transfer function $G_P(s)$ of plant segment, 20' may be expressed in terms of its complex poles and zeros by equation 1

$$G_p(s) = \frac{K_1(s+b_1)(s+b_2)\ldots(s+b_r)}{(s+l)(s+d_1)\ldots(s+d_p)} \quad \text{(Eqn. 1)}$$

where $b_1, b_2,\ldots b_r$ are the dominant zeros and $e, d_1\ldots d_p$ are the dominant poles. Pole is any selected one of the ($p=1$) dominant poles of the plant.

Figure 2:
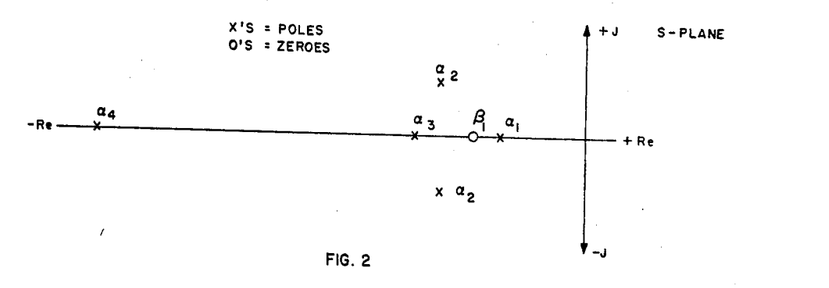
FIG. 2 is an *s*-plane pole-zero map illustrating the dominant poles of a system.

In this specification, any pole or zero that has a significant effect on the response of the plant is defined as being dominant. Generally, dominant poles are the poles closest to the origin of the complex plane that are not neutralized by the proximity of a zero. Similarly, dominant zeros are the zeros closest to the origin that are not neutralized by the presence of a pole. For instance, the $s$-plane diagram of a hypothetical system may appear as in FIG. 2. There poles $\alpha_2$ and $\alpha_3$ are dominant poles. Being near the origin, they have the greatest influence on the system's dynamic response. Pole $\alpha_1$, although closest to the origin, is effectively neutralized by zero $\beta_1$. Pole $\alpha_4$, being far removed from the origin and therefore having little influence on the dynamic response of the plant is not a dominant pole. Zero $\beta_1$ would be a dominant zero if it were not for the proximity of pole $\alpha_1$. For the purposes of this specification, any one of the dominant poles may be selected as $l$. Also, the characteristic frequency of any dominant pole is the vector distance from the origin of the $s$-plane to that pole. It is equal to the amplitude of the pole in the $s$-plane and can vary with positional changes of the pole. Thus, the characteristic frequency of the selected dominant pole is $l$, the same as its amplitude in the complex plane.

Equation 1 may be expressed in the form of equation 2

$$G_p(s) = \frac{K_2\left(1+\frac{s}{b_1}\right)\left(1+\frac{s}{b_2}\right)\cdots\left(1+\frac{s}{b_r}\right)}{\left(1+\frac{s}{l}\right)\left(1+\frac{s}{d_1}\right)\cdots\left(1+\frac{s}{d_p}\right)} \quad \text{(Eqn. 2)}$$

The combined transfer function of holding unit 16 and plant segment 20', termed $G(s)$, is obtained by multiplying equation 2 by the transport delay function $\frac{(1-e^{-Ts})}{s}$ for a zero order hold. The combined function may then be normalized by the amplitude of selected dominant pole $l$. Transfer function $G(s)$ then becomes $$G(s) = \frac{(1-e^{-Ts})\frac{K_2}{l}\left(1+\frac{l}{b_1}\frac{s}{l}\right)\left(1+\frac{l}{b_2}\frac{s}{l}\right)\cdots\left(1+\frac{l}{b_r}\frac{s}{l}\right)}{\left(\frac{s}{l}\right)\left(1+\frac{s}{l}\right)\left(1+\frac{l}{d_1}\frac{s}{l}\right)\cdots\left(1+\frac{l}{d_p}\frac{s}{l}\right)}$$

(Eqn. 3)

The analysis now assumes that the motion of the dominant poles and zeros in the $s$-plane has two salient properties. First, when a dominant pole or zero changes location it moves in essentially a radial direction relative to the origin. Second, the motion of all dominant poles and zeros is substantially uniform in that their amplitudes all change by about the same percentage and sign with respect to their starting values. As a result of these restrictions, the ratios $$\frac{l}{b_1}, \frac{l}{b_2}\cdots\frac{l}{b_r}, \text{ and } \frac{l}{d_1}, \frac{l}{d_2}, \cdots \frac{l}{d_p}$$

of equations 3 remain essentially constant.

New information is processed by the control loop only at the sampling instants. The remainder of the time the discontinuous control signal $C_M(s)$ is held at the output terminals of holding unit 16. Consequently, the transfer function that is of prime concern is the one existing at the sampling instants. It is sometimes called the pulse transfer function $g^*(s)$ and applies to the combined plant and holding unit. It can be defined by the complex convolution of equation 4, that is, $$G^*(s) = \frac{1}{2\pi j}\int_{c-j\infty}^{c+j\infty}\frac{G(\lambda)}{(1-e^{-T(s-\lambda)})}d\lambda \quad \text{(Eqn. 4)}$$

where $c$ is a real number, $j=\sqrt{-1}, T$ the sampling period, and $g(\lambda)$ the combined transfer function with dummy variable $\lambda$. By defining $M(\lambda/l)$ and $G(\lambda)$ as $$M\left(\frac{\lambda}{l}\right) = \frac{\left(1+\frac{l}{b_1}\frac{\lambda}{l}\right)\left(1+\frac{l}{b_2}\frac{\lambda}{l}\right)\cdots\left(1+\frac{l}{b_r}\frac{\lambda}{l}\right)}{\frac{\lambda}{l}\left(1+\frac{\lambda}{l}\right)\left(1+\frac{l}{d_1}\frac{\lambda}{l}\right)\cdots\left(1+\frac{l}{d_p}\frac{\lambda}{l}\right)}$$

(Eqn. 5)

and $$G(\lambda) = \frac{(1-e^{-\lambda T})}{l}K_2 M\left(\frac{\lambda}{l}\right)$$

the complex convolution becomes $$G^*(s) = \frac{K_2}{2\pi j l}\int_{c-j\infty}^{c+j\infty}\frac{(1-e^{-\lambda T})M\left(\frac{\lambda}{l}\right)}{(1-e^{-T(s-\lambda)})}d\lambda$$

(Eqn. 6)

If the system operates within the constraint $Tl=K$, a constant, the integration can be expressed relative to the normalized variable $\left(\frac{\lambda}{l}\right)$.

$$G^*(s) = \frac{K_2}{2\pi j}\int_{\frac{c}{l}-j\infty}^{\frac{c}{l}+j\infty}\frac{\left(1-e^{\frac{-K\lambda}{l}}\right)M\left(\frac{\lambda}{l}\right)}{1-e^{-sT}e^{\frac{K\lambda}{l}}}d\left(\frac{\lambda}{l}\right)$$

(Eqn. 7)

Making $c'=\frac{c}{l}$ and $\left(\frac{\lambda}{l}\right)=\rho$ simplifies the expression so that $$G^*(s) = \frac{K_2}{2\pi j}\int_{c'-j\infty}^{c'+j\infty}\frac{(1-e^{-K\rho})M(\rho)d\rho}{1-e^{-sT}e^{K\rho}} \quad \text{(Eqn. 8)}$$

In sampled data system analysis, the pulse transfer function is usually examined from its $z$-transfer function $G(z)$. The latter is derived by evaluating equation 8 according to equation 9.

$$G(z) = G^*(s)|_{z=e^{sT}} \quad \text{(Eqn. 9)}$$

Performing this evaluation equation 8 becomes equation 10, or $$G(z) = \frac{K_2}{2\pi j}\int_{c'-j\infty}^{c'+j\infty}\frac{(1-e^{-K\rho})}{1-z^{-1}e^{K\rho}}M(\rho)d\rho \quad \text{(Eqn. 10)}$$

It is evident from equation 10 that the dominant poles and zeros of $G(z)$ are invariant. This indicates that the transfer function at the respective sampling instants is independent of variations occurring in the plant's responsiveness over real time. The result is achieved for plants with radial and uniform motion of dominant poles and zeros by making the product of the sampling period and the amplitude of the selected dominant pole constant, or $Tl=K$.

Figure 2A:
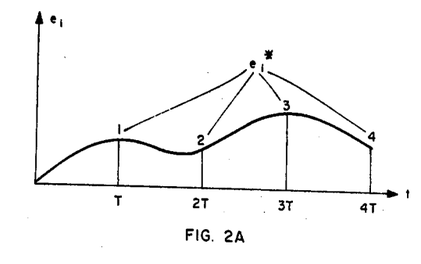
FIGS. 2A and 2B illustrate the sampled impulse response of a system incorporating compensation in accordance with the invention.
Figure 2B:
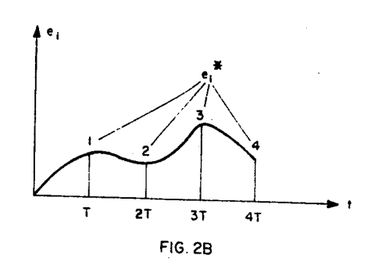

The net effect of the constraint on the pulse transfer function is demonstrated in FIG. 2A and FIG. 2B in terms of sampled error signal $e_i^*$. With the system operating under the constraint $Tl=K$, time variations in the plant's dynamic characteristics cause time compression or expansion of error signal $e_i$. For instance, when input $R_M$ is a step function changes in the plant may compress signal $e_i$ from the form of FIG. 2A to that of FIG. 2B in a real time scale. However, the sampled error signal remains invariant in terms of the normalized time scale ($t/T$). This means that the particular points sampled by sampler 12, such as points 1, 2, and 3 remain unchanged in normalized time. Thus, the resulting sampled error signal $e_i$, and, consequently intermittent command signal $C_M$ of FIG. 1, are both unaffected by dynamic variations in the plant. Because signal $e_i^*$ is invariant, the compensator may operate on the same difference equation and a single set of coefficients to provide the necessary compensation over the entire dynamic range of the plant.

The result of equation 10 may be conceptually simplified from the perspective of a functional frequency coupling or scaling between the compensation frequency and the speed at which the plant responds to its control signal. The plant's reaction is determined by the position or amplitude of the dominant poles in the complex plane. It is recalled that the positions vary with parametric changes in the plant or its operating environment. As the dominant poles move closer to the origin, the plant's response becomes sluggish, whereas as the poles move away, the plant responds more rapidly. In view of the requirement that all dominant poles have substantially uniform and radial motion, the characteristic frequency of any dominant pole, say pole $l$, generally reflects the true state of the plant's varying time response. As the characteristic frequency $l$ increases, the plant's response quickens; and conversely, as $l$ decreased the plant becomes more sluggish. With the constraint $T=K/l$, the compensation frequency $f=1/T$ is proportional to the characteristic frequency and thus follows the plant's response. Equation 10 indicates that the constraint preserves the information in the sampled error signal and the latter is not affected by parametric changes occurring in the plant over real time.

In many plants s-plane motion of the dominant poles and zeros is not strictly radial and uniform. The ability of the constraint to preserve error information or satisfactorily approximate it under such nonideal plant conditions is difficult to specify precisely as this largely depends on the performance and stability margins placed on the system. The derivation of an error signal in any sampled data system is an approximation process. The degree of approximation tolerable obviously is commensurate with specified performance and stability margins which vary from application to application. Similarly, with respect to the present invention, where performance and stability margins are loose, the qualification that motion of the dominant poles and zeros be radial and uniform is correspondingly lenient. Conversely, in applications where the margins are to be more closely controlled the qualification is more strict. In the final analysis whether the nature of the expected changes in plant dynamics may be contained by the constraint $Tl=K$ so as to have an insignificant effect on the sampled error signal is to be determined, as in the design of other sampled data systems, by electronic simulation in view of preset performance and stability margins.

It is also noted that the gain factor $K_2$ of equation 10 is treated as a constant. In some systems, however, gain $K_2$ may be a function of the position of dominant pole $l$. In this event, a compensating gain may be provided in the forward path whose amplitude is the inverse of gain $K_2$'s dependence on $l$. The product of $K_2$ and the compensating gain makes the combined gain in the forward path independent of $l$. Gain $K_2$'s dependence on $l$ is similarly determinable by simulation of the system under study, or from knowledge of the behavior of the system's differential equations.

PREFERRED EMBODIMENT

Figure 3:
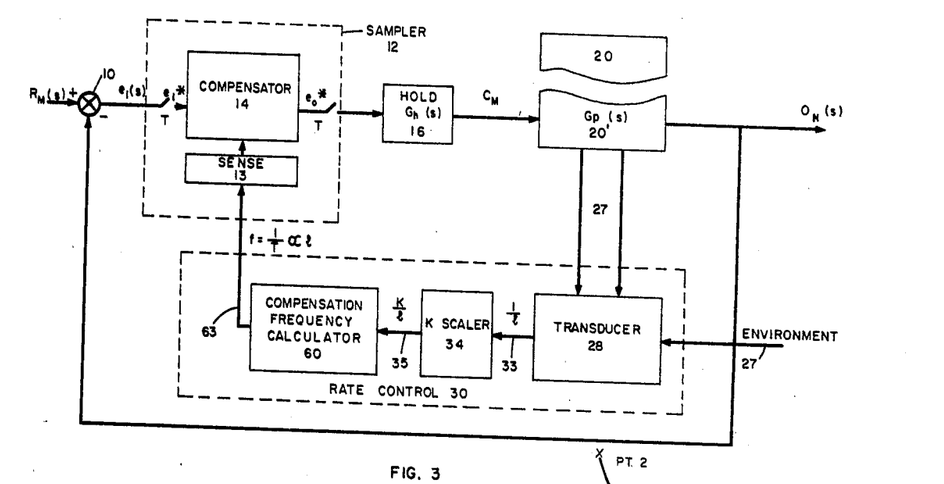
FIG. 3 is a block diagram of the system of FIG. 1 incorporating the present invention.

A system employing the principles of the present invention is illustrated in FIG. 3. It comprises the sampled data control system of FIG. 1 and compensation rate control 30. Rate control 30 governs the frequency at which compensator 14 compensates error signal $e_i$. The rate at which compensation is applied is functionally illustrated the operational frequency $1/T$ of the sampling switch that receives error $e_i$. Rate control 30 has transducer 28 that receives relevant parameters 27 inherent of plant segment 20' or its operating environment that are mathematically related to the characteristic frequency $l$ of the dominant pole selected for monitoring. The relationship between parameters 27 and the pole's position may be analytical or tabular. Moreover, the transducer may be an electromechanical device, a digital computer with stored tables relating parameters 27 to the pole, or a calculator that performs a mathematical function. The transducer converts parameters 27 into an electrical signal 33 inversely proportional to the characteristic frequency $l$ of the pole. Scaler 34 multiplies signal 33 by an appropriate constant $K$ and couples the resultant signal $K/l$ to calculator 60. The calculator processes the signal and emits timing signals 63 of frequency $f$ to sense line 13 that synchronize the operating frequency of sampler 12 and compensator 14.

Figure 3A:
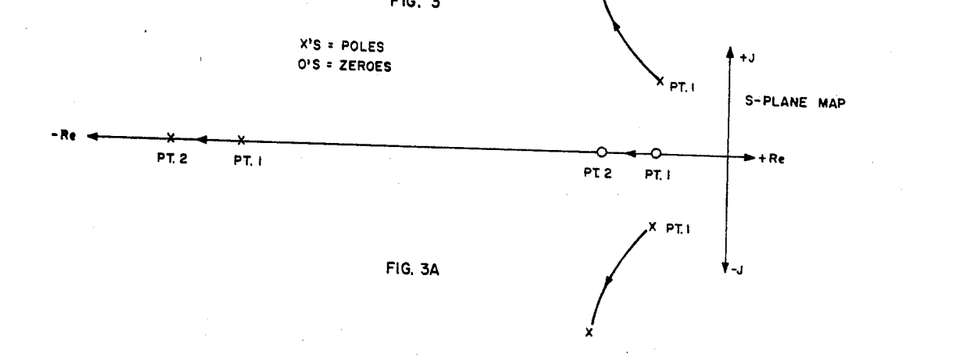
FIG. 3A illustrates typical variations of the dominant poles of an aircraft between two flight conditions.

The relation between parameters 27 and the monitored dominant pole depends on the nature of plant 20' and is revealed after an analysis or simulation of the plant's behavior pattern over its anticipated operating range. For example, the variational pattern of the dominant poles of an aircraft determined by wind tunnel, flight tests, or simulation between two bounding flight conditions, low speed, high altitude flight (points 1) and high speed, low altitude flight (points 2) may be as is illustrated in FIG. 3A. The loci of real poles and zeros are radial with respect to the origin. The loci for complex poles is substantially radial as they possess minor angular charges. The poles and zeros are related to two of several parameters, including air speed, altitude, dynamic pressure and mach number. Thus, if the control system of FIG. 3 were applied to an aircraft with the characteristic of FIG. 3A, transducer 28 would receive two of such parameters and thereby monitor the characteristic frequency $l$ of the selected one of the two distinct dominant poles.

Referring again to FIG. 3, the switches of sampler 12 are electronic circuits that momentarily couple input error $e_i$ to compensator 14 and compensated signal $e_o^*$ to hold unit 16. The switching occurs at frequency $f$ prescribed by timing signals 63 that activate sense line 13. After each coupling of error $e_i$, compensator 14 compensates sampled signal $e_i^*$ to produce discontinuous output signal $e_o^*$ according to a difference equation. The difference equation is derived by synthesizing a transfer function D(z) that combines with the initial dynamic characteristics of the plant to produce a satisfactory closed loop transfer function in terms of preset stability and performance specifications. The transfer function may be expressed as a ratio of two polynominals in power of $z_1^1$, or $$D(z) = \frac{e_o^*}{e_i^*}(z) = \frac{z^{-u}(g_u + g_{u+1}z^{-1} + \cdots g_{u+v}z^{-v})}{1 + h_1 z^{-1} + h_2 z^{-2} + \cdots h_w z^{-w}}$$

(eqn. 11)

where $v+u=w$ for a realizable compensator. Equation 11 when transformed into the time domain yields the difference equation implemented by the computer, or $$e_o^*(t) = \sum_{a=u}^{u+v} g_a e_i^*(t-aT) - \sum_{a=1}^{w} h_a e_o^* (t-aT)$$

(eqn. 12)

The computer thus provides an updated output $e_o^*(t)$ based on previous values $e_i^*(t-aT)$ and $e_o^*(t-aT)$ and stored coefficients $g$ and $h$. Because the compensation frequency $f$ is proportional to the characteristic frequency $l$ of the monitored dominant pole, a single difference equation and a single set of coefficients provides the necessary compensation to maintain the desired closed loop characteristics over the entire dynamic range of plant 20'. Each manipulation of the difference equation involves the arithmetic operation of addition, subtraction, multiplication and storage transfer. Methods for mechanizing equation 12 are well within the art and are discussed in Kuo, *Analysis and Synthesis of Sampled-Data Control Systems*, Prentice-Hall, 1963 at chapter 9, and in the previously cited reference of Monroe.

Figure 3B:
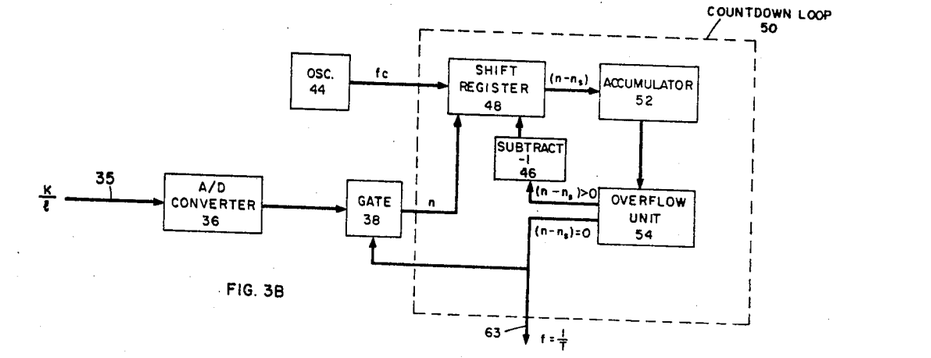
FIG. 3B is a block diagram of the compensation frequency calculator of FIG. 3.

A suitable calculator 60 is illustrated in FIG. 3B. It comprises oscillator 44, analog to digital converter 36, gate 38 and count-down loop 50. Oscillator 44 emits a pulse train of frequency $f_c$. Converter 36 transforms pole monitoring signal $K/l$ into a digital integer $n$ approximately equal to the ratio $Kf_c/l$. Integer $n$ is transferred to the memory of shift register 48 at the beginning of each compensation period. Count-down loop 50 includes shift register 48, accumulator 52, overflow unit 54 and unit subtractor 46. Unit 54 sequentially compares the successive remainders in accumulator 52 with zero. When a remainder is zero the unit supplies a timing signal 63 for sense line 13 in sampler 12 of FIG. 3.

The sequential operation of calculator 60 is as follows. Pole monitoring signal $K/l$ is converted into integer $n$ and $n$ is transferred to the memory of shift register 48. Converter 36 thereupon begins digitizing a series of updated values of $K/l$. However, gate 38 inhibits the transfer of the recalculated values until it receives a timing signal 63 whereupon the most recent value is transferred into the memory. An initial pulse from oscillator 44 causes register 48 to shift the number $n$ into accumulator 52. The number in accumulator 52 at any time is $(n-n_s)$ where $n_s$ is the number of unit subtractions performed by subtractor 46. Initially $n_s=$ and thus overflow unit 54 compares $n$ with zero. If $n>0$, subtractor 46 deducts one digit from $n$ and the remainder $(n-1)$ is cycled back into register 48. Upon the occurrence of a subsequent clock pulse, register 48 shifts remainder $(n-1)$ into accumulator 52 and unit 54 compares $(n-1)$ with zero. If $(n-1)>0$, another digit is subtracted and the remainder $(n-2)$ is cycled back into shift register 48 for further recycling of the remainder $(n-nas)$ upon the occurrence of each basic clock pulse. When $(n-nas)=0$ overflow unit 54 emits a timing signal 63 to sense line 13 and to gate 38. The gate is opened and the updated value of $n$ passes into register 48. Timing signals 63 produced by this dividing operation have a frequency $f$ that is proportional to characteristic frequency $l$ of the monitored dominant pole. They prescribe the rate at which compensator 14 manipulates difference equation 12 and thus compensates error $e_i$.

DESIGN EXAMPLE

Figure 4:
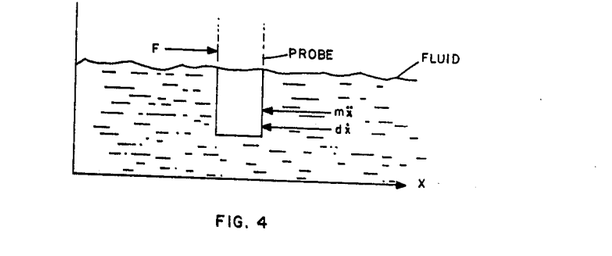
FIG. 4 is a free body diagram of a fluid probe control demonstrating the principles of the invention.

The foregoing principles of the invention are next demonstrated in the context of a problem encountered by a drive mechanism for controlling the position of a probe in a fluid whose drag force is highly dependent on temperature. As illustrated in FIG. 4, the fluid imparts a drag force on the probe that opposes drive force $F$ of the mechanism. Where $s$ is a LaPlace operator, $x$ the position of the probe, $m$ its mass and $d$ the drag coefficient, the differential equation for the problem is $$(ms^2 \gamma \beta) X(s) = F(s)$$

and the corresponding transfer function is $$\frac{X}{F}(s) = \frac{\frac{1}{m}}{s\left(s - \frac{d}{m}\right)}$$

Figure 4A:
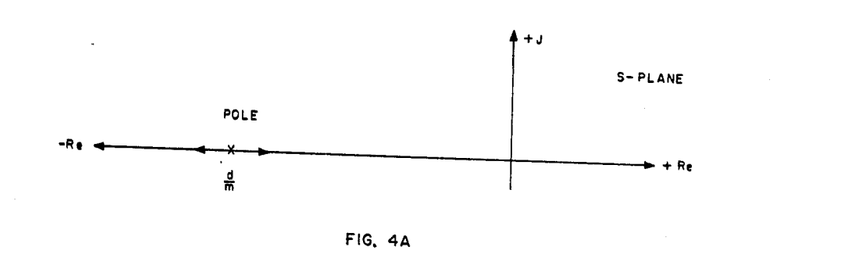
FIG. 4A is *s*-plane map showing the dominant pole of the plant of FIG. 4.

It is recognized that the quantity $d/m$ is the characteristic frequency of the sole dominant pole of the plant, that is, the combination of probe and fluid. As illustrated in FIG. 4A, the pole is real. Since the drag of the fluid is temperature sensitive, characteristic frequency $d/m$ or the position of the dominant pole varies with temperature. Motion of the pole is completely radial being along the negative real axis of FIG. 4A.

Figure 4B:
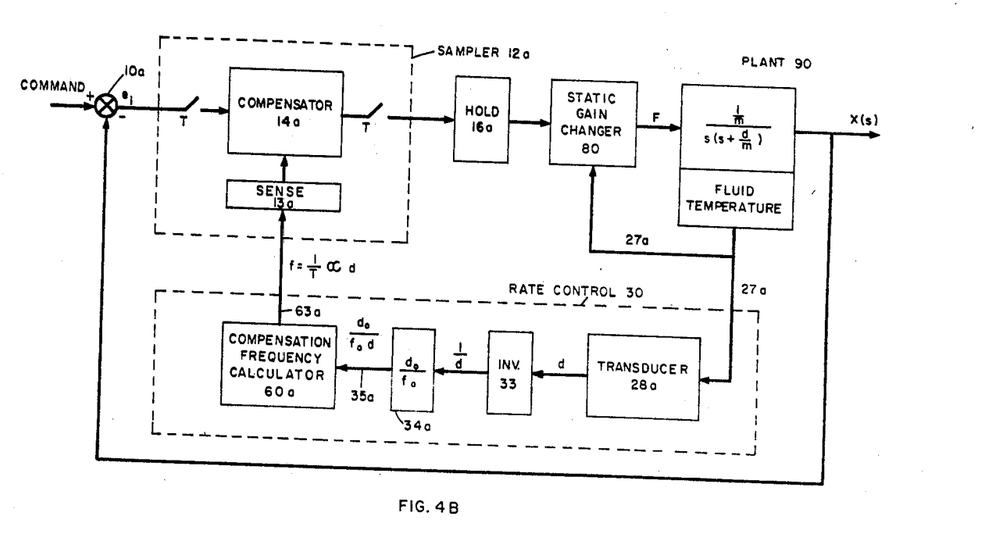
FIG. 4B is a block diagram of the control system of FIG. 4.

The system of FIG. 4B provides the compensation necessary for meeting the changing dynamic conditions of the plant. It comprises summer 10a for comparing the command and output signals, sampler 12a with digital computer 14a providing compensation at a rate controlled by sense line 13a, hold unit 16a, static gain changer 80, and rate control 30 with transducer 28a, scaler 34a, and compensation frequency calculator 60a. The operation of the system is as previously discussed in conjunction with FIG. 3. Gain changer 80 functions to maintain the static gain of the loop constant. The appropriate static gain is determined by temperature information 27a derived from the plant.

As previously described in connection with the preferred embodiment, a preset compensation frequency $f_0$ is selected with view toward a preset characteristic frequency $d_0/m$ within the range of values anticipated for $d/m$. Since the mass $m$ of the probe is constant, mechanization of the system may be simplified by coupling the compensation frequency $f$ to coefficient $d$ only. In this event the preset values are calibrated in terms of a preset value of drag $d_0$. Compensation frequency $f_0$ is compatible with desired stability and performance criteria. The constant set in scaler 34a is $d_0/f_0$.

Coefficient $d$ is a function of the temperature of the plant. The relationship may be an analytic function or determined by a set of tables based on empirical data. In either case, transducer 28 converts temperature information 27a into a corresponding value of $d$ that is inverted by inverter 33. Upon modification by scaler 34a, signal 35a coupled to calculator 60a is $(d_0/f_0)(1/d)$.

Calculator 60a is analogous to the calculator of FIG. 3B. The analog input signal is of the same form as that previously discussed being a constant divided by the drag $d$ corresponding to the dominant pole. As before, the analog to digital converter in calculator 60a transforms signal 35a into a digital number $n$ that constitutes the divisor of the frequency division of a basic clock pulse $f_c$. A series of timing pulses 63a is generated whose frequency $f$ complies with the rule of the invention, or $f=(f_0/d_0)d$. Timing pulses 63a are coupled to sense line 13a and control the rate at which computer 14a manipulates a difference equation and compensates error signal $e_i$.

In the embodiments of FIG. 3 and 4B the components have been described as a composite of analogue and digital equipment. However, it is well known that all functions conducted by them may be performed by a single digital computer. Specifically, the function of summers 10 and 10a, compensators 14 and 14a, hold units 16 and 16a, transducers 28 and 28a, calculators 60 and 60a, and associated scalers and gain changers may be conducted digitally within a computer. In such an event, the computer receives as its inputs command signal $R_M$, information 27 or 27a regarding the characteristic frequency of the plant, and an output variable $0_N$ or $X$ and supplies control signal $C_M$ or $F$ to the plant.

Figure 5:
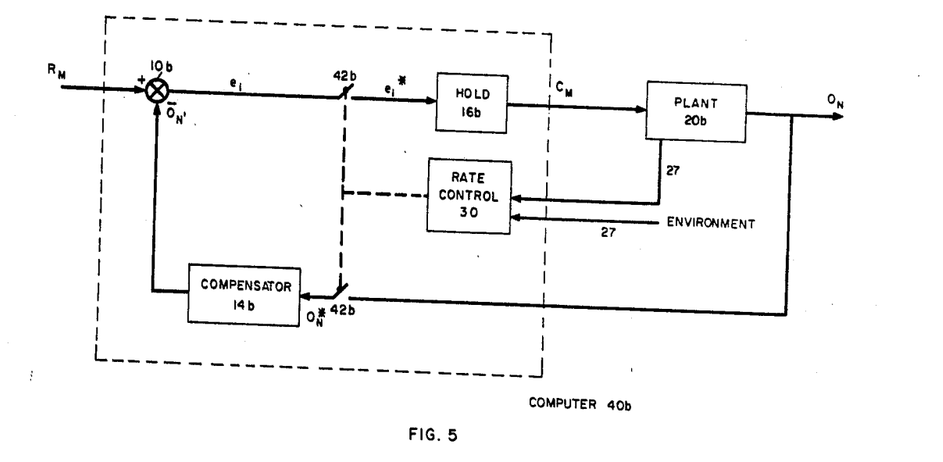
FIG. 5 is a simplified block diagram of a feed back compensated system using the invention.

Although compensation has been described as embodied in the forward path of a sampled data feedback system, it is equally applicable in control systems using feedback compensation. A fundamental version of feedback compensation is illustrated in FIG. 5. Compensator 14b samples the corresponding output variable $0_N$ to produce signal $0_N^*$ and thereupon compensates signal $0_N^*$ to supply signal $0_N'$. Signal $0_N'$ is coupled to summer 10b where it is summed with command signal $R_M$. The resulting error signal $e_i$ is periodically sampled and coupled through hold unit 16b whereupon it constitutes control signal $C_M$ of plant 20b. Switches 42b are synchronized so that compensation of output $0_N$ and sampling of error $e_i$ occur at the same frequency—one that is proportional to the characteristic frequency $l$ of a selected dominant pole.

Although not shown for purposes of simplicity, the generation of appropriate timing signals to initiate compensation is derived by monitoring the characteristic frequency $l$ of a selected dominant pole in the same manner as previously described in the context of compensation in the forward path. As before, compensation and the generation of control signal $C_M$ may be performed entirely within a digital computer 40b. In this or any event compensator 14b may be a digital computer producing an updated value $O_N'(t)$ of signal $O_N'$ by computations in accord with a difference equation.

Figure 5A:
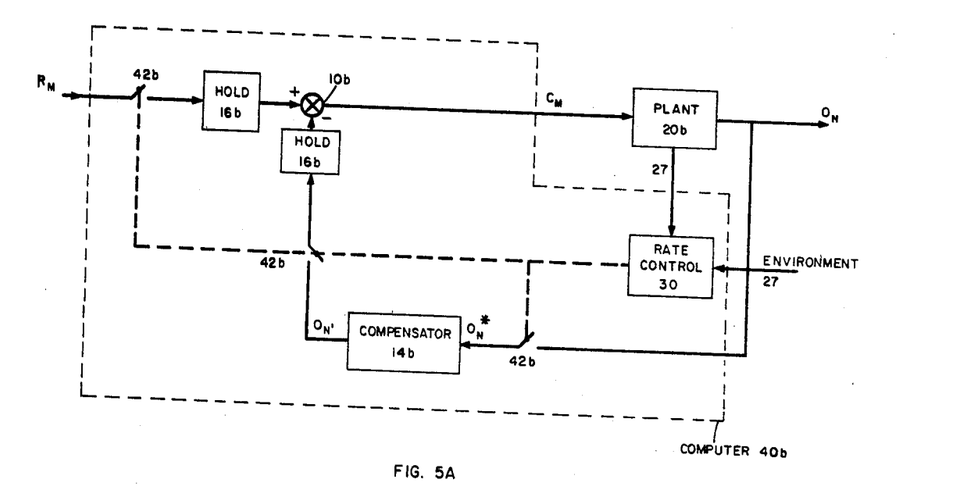
FIG. 5A is an equivalent form of the system of FIG. 5.

Since sampling, summing and holding are linear operations, the holding unit of FIG. 5 may be transferred to the opposite side of summer 10b. In this case the system takes the equivalent form shown in FIG. 5A. Hold units 16b are of the same order and switches 42b are synchronized and operate at a frequency proportional to $l$.

Figure 5B:
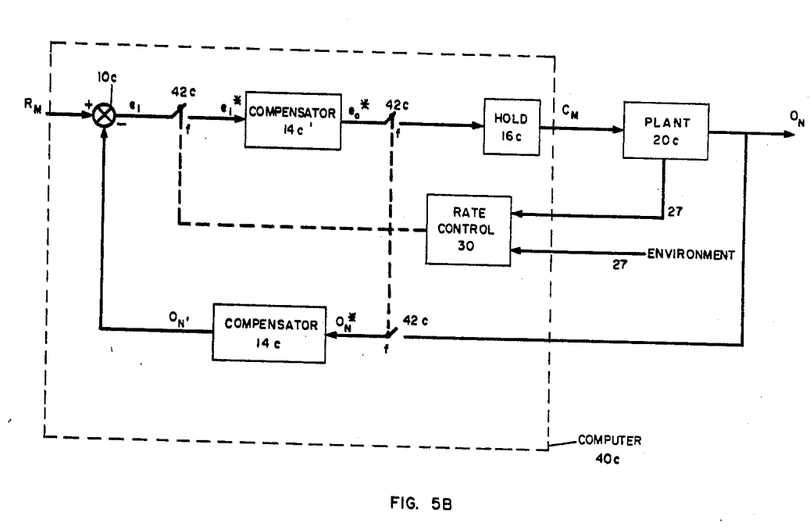
FIG. 5B is a simplified block diagram of a system with compensation in the forward and feedback paths that incorporates the invention.

In some feedback control systems it is advisable to provide compensation in both the forward and feedback paths. Such a system for controlling plant 20c is shown in FIG. 5B. As is there illustrated, both compensators are contained in digital computer 40c. The computer thus operates on two difference equations to provide compensation, one being applied to output variable $O_n$ and the other to error signal $e_i$ supplied by summer 10c. Switches 42c are all synchronized so compensators 14c and 14c' perform computations at a frequency $f$ proportional to the characteristic frequency $l$ of the selected dominant pole. Again, for simplicity, means for generating timing signal to initiate computations for compensating both signals is omitted.

While particular embodiments have been described, it should be understood that the invention is not to be so limited. Modifications may be made and yet remain within the intended scope and spirit of the invention. For instance, although the computer is shown as implementing a particular linear difference equation, the equation may take other linear forms. Similarly, the equation may be nonlinear. The matter of digital compensation using linear or nonlinear difference equations is well within the art. The various forms of equations are not detailed because the invention concerns the rate at which compensation is applied rather than the form of compensator used. Thus the compensator may also be embodied in lumped circuit which for purposes of this specification includes an analogue computer. Again, the compensator may be linear or nonlinear. Furthermore, timing signals for controlling the operating frequency of the sampler or compensator may be satisfactorily supplied by units other than the calculator shown. It is comprehended, therefore, to cover these and other modifications that fall within the true scope of the invention by the appended claims.

What I claim is:

1. In a sampled data feedback system for supplying discontinuous control signals $C_M$ according to command signal $R_M$ to a plant having an output variable $O_N$ and a dominant pole with a characteristic frequency $l$ that reflects said variable $O_N$'s responsiveness to said control signal $C_M$ and where said system further includes a summer for summing said command $R_M$ and a feedback signal related to said variable $O_N$, thereby producing an error signal $e_i$, and where said system further includes a sampler comprising a compensator and a first sensing means, said compensator periodically sampling said error $e_i$ to produce sampled error signal $e_i^*$ and compensating said error $e_i^*$, thereby producing a discontinuous output signal $e_0^*$, and said first sensing means for controlling the frequency $f$ at which said compensator compensates said signal $e_i^*$, said system also having second means including a hold unit receiving said signal $e_0^*$ and producing said control $C_M$ coupled to said plant, the improvement which resides in compensation for varying said frequency $f$, said compensating comprising a. third means ascertaining said characteristic frequency $l$ and providing an output signal that is a function of $l$; and
b. fourth means coupled to said first sensing means and receiving said output signal of said third means and activating said first sensing means so that compensation frequency $f$ is proportional to said characteristic frequency $l$.

2. The improvement as defined in claim 1 wherein said characteristic frequency $l$ is related to parameters of said plate and wherein said third means monitors said parameters and supplies said output signal that is a function of $l$.

3. The improvement as defined in claim 1 wherein said characteristic frequency $l$ is related to parameters of said plant's environment and wherein said third means monitors said parameters and supplies said output signal that is a function of $l$.

4. The improvement as defined in claim 1 wherein said characteristic frequency $l$ is related to parameters of said plant and said plant's environment and wherein said third means monitors said parameters and supplies said output signal that is a function of $l$.

5. The improvement as defined in claim 1 wherein said compensator constitutes a digital computer that produces an updated value $e_0^*(t)$ of said output $e_0^*$ according to computations based on a difference equation and wherein said first means instructs said computer to repeat said computations at said frequency $f$.

6. An improvement in compensation for a sampled data feedback control system supplying a discontinuous control signal $C_M$ according to a command signal $R_M$ to a plant having an output variable $O_N$ and a dominant pole with a characteristic frequency $l$ reflecting said variable $O_N$'s response to said control signal $C_M$ and where said system further includes a summer for summing said command $R_M$ and a feedback signal related to said variable $O_N$ thereby producing an error signal $e_i$, and where said system further includes a sampler comprising a digital computer and a first sensing means, said digital computer periodically sampling said error $e_i$ to produce a sampled error signal $e_i^*$ and compensating said sampled error $e_i^*$, thereby producing a compensated discontinuous output signal $e_0^*$ according to the transfer function $$\frac{e_0^*}{e_i^*} = \frac{z^{-u}(g_u + g_{u+1}z^{-1} + \cdots g_{u+v}z^{-v})}{(1 + h_1 z^{-1} + h_2 z^{-2} + \cdots h_w z^{-w})}$$

where $v + v = w$, by performing the computations based on the difference equation $$e_0^*(t) = \sum_{a=u}^{u+v} g_a e_i^*(t - aT) - \sum_{a=1}^{w} h_a e_0^*(t - aT)$$

and said first sensing means controlling the frequency $f$ at which said computations are performed, said system further having second means including a hold unit receiving said signal $e_0^*$ and producing said control signal $C_M$ coupled to said plant, said improvement comprising;

a. third means for ascertaining said characteristic frequency $l$ and providing an output signal that is a function of $l$; and
b. fourth means coupled to said first sensing means and receiving said output signal of said third means and activating said first sensing means so that compensation frequency $f$ is proportional to characteristic frequency $l$.

7. The improvement as defined in claim 6 wherein said first means constitutes a sense line coupled to said computer and said fourth means supplies a series of timing pulses each of which causes said sense line to instruct said computer to perform a new computation said pulses having a frequency proportional to said characteristic frequency $l$.

8. In a sampled data feedback system for supplying discontinuous control signal $C_M$ according to a command signal $R_M$ to a plant having an output variable $O_N$ and a dominant pole with a characteristic frequency $l$ that reflects said variable $O_N$'s responsiveness to said control signal $C_M$ and where said system further includes a summer for summing said command $R_M$ and a feedback signal $O_N'$ related to said variable $O_N$ thereby producing an error signal $e_i$ said system including a feedback sampler, said sampler comprising a compensator that samples and compensates said variable $O_N$ to produce said feedback signal $O_N'$ and a first means for controlling the frequency at which said compensator compensates said signal $O_N$, said system further including second means for sampling said error $e_i$ producing sampled error signal $e_i^*$ and third means including a hold unit receiving said sampled error $e_i^*$ and producing said control signal $C_M$ and coupling said signal $C_M$ to said plant, the improvement in compensation comprising, a. fourth means ascertaining said characteristic frequency $l$ and providing an output signal that is a function of $l$, and
b. fifth means coupled to said first and second means and receiving said output signal of said fourth means and activating said first and second means so that said compensation of signal $O_N$ and said sampling of error $e_i$ are synchronized and occur at a frequency $f$ proportional to said characteristic frequency $l$.

9. The improvement as outlined in claim 8 wherein said compensator constitutes a digital computer that produces an updated value $O_N'(t)$ of said feedback signal $O_N$ according to computations based on a difference equation and wherein said first means instructs said computer to repeat said computations at said frequency $f$.

10. The improvement as set forth in claim 9 wherein said third means includes a digital computer compensating said sampled error $e_i^*$ according to computations based on a difference equation and activated by said fifth means so that said computations are synchronized with those occurring in said compensator.